April 21, 1942.  J. E. BRYANT  2,280,752
LOCKING DEVICE FOR BRAKE BLEED VALVES
Filed March 6, 1941
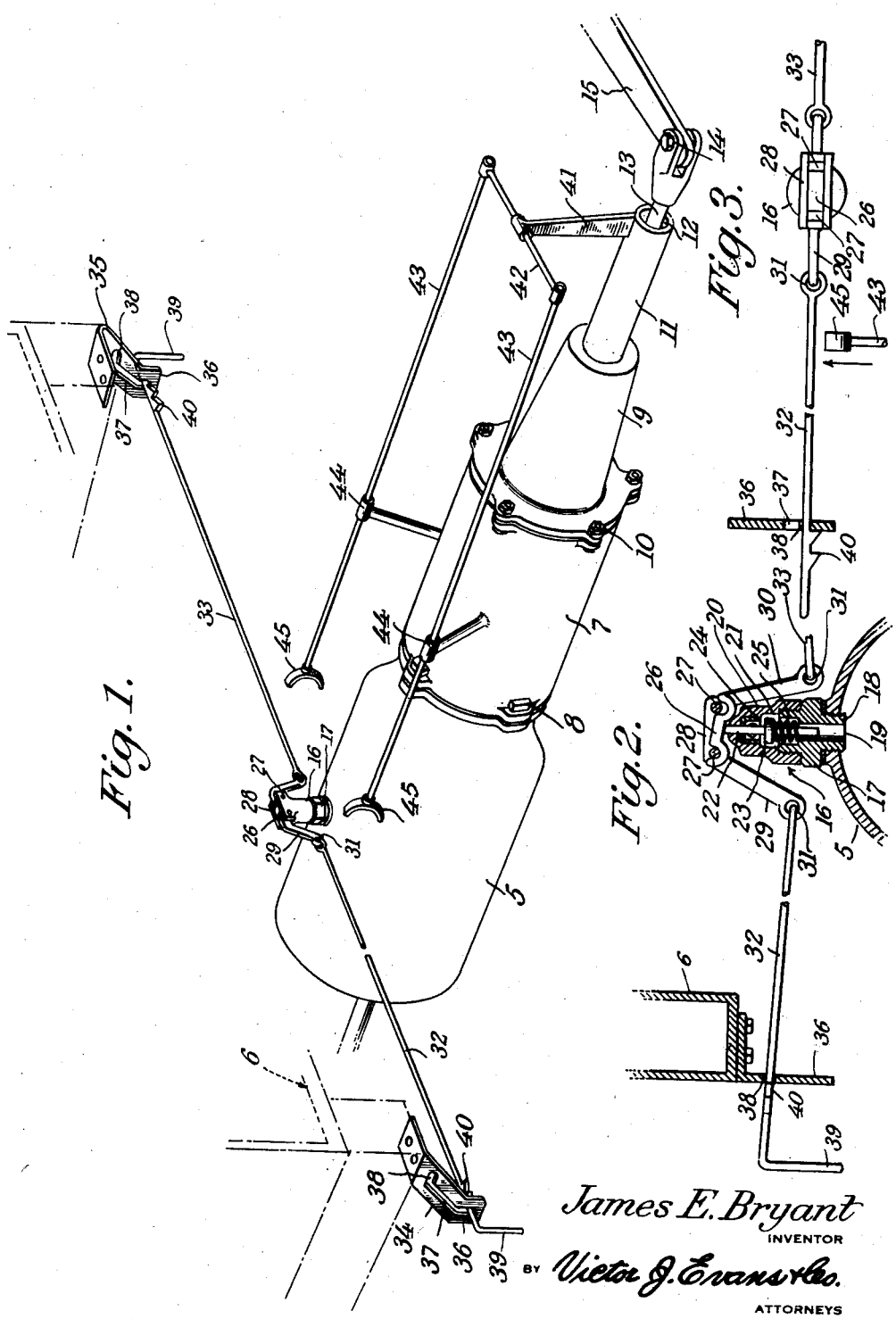
James E. Bryant
INVENTOR
BY Victor J. Evans & Co.
ATTORNEYS Patented Apr. 21, 1942

2,280,752

UNITED STATES PATENT OFFICE 2,280,752

LOCKING DEVICE FOR BRAKE BLEED VALVES

James E. Bryant, Escalon, Calif.

Application March 6, 1941, Serial No. 382,066

3 Claims. (Cl. 303—80)

The present invention relates to an improved locking device for brake bleed valves as employed with auxiliary reservoirs of the air brake system on railway cars.

The primary object of the invention is to provide improved means for moving the release valve of an auxiliary reservoir to open position and to lock said means with the release valve in open position.

Another object of the invention aims to provide means for automatically disengaging the release valve locking means after the air has been exhausted from the auxiliary reservoir.

A still further object of the invention is to provide a locking and releasing means of the above-mentioned character which will at all times be positive and efficient in carrying out the purposes for which it is designed, the same being further simple in construction, relatively inexpensive to manufacture, and strong and durable.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a perspective view of an auxiliary reservoir with the invention applied thereto.

Figure 2 is an enlarged sectional view of the valve with one of the operating rods being shown in locked position.

Figure 3 is a fragmentary top plan view thereof.

Referring to the drawing for a more detailed description thereof, the auxiliary reservoir of the air brake system of a railway car is designated by the reference numeral 5, the same being suspended from the bottom of the car in a manner well known in the art. The railway car with which the reservoir is associated is diagrammatically shown in Figure 1 of the drawing and is generally designated by the reference numeral 6. A cylinder 7 is bolted or otherwise secured as indicated at 8 to one end of the reservoir 5 for communication therewith, the outer end of the cylinder having a guide 9 bolted or otherwise secured thereto as indicated at 10. A rod 11 supports on its inner end a piston, not shown, said rod moving within the guide 9 upon the actuation of the air brake system. The rod 11 is bored as indicated at 12 and loosely supports therein a push rod 13, said push rod being coupled as indicated at 14 with a bracket 15 leading to the brake system. As is to be understood, the reservoir 5, cylinder 7, guide sleeve 9, rods 11 and 13 and bracket 15 are of conventional construction and form no part of the present invention.

The release valve of the reservoir 5 is generally designated by the reference numeral 16 and comprises a section 17 having a stem 18 threadedly secured in the reservoir, said stem being provided with a passageway 19. A cap 20 is attached to the section 17, said cap being formed with a passageway 21 communicating with the passageway 19 in which operates a valve stem 22 carrying a valve 23. In closed position the valve rests against its seat 24 being held thereagainst by means of a tension spring 25. However, when desiring to exhaust the air from the reservoir, the stem 22 is depressed to disengage the valve 23 from its seat allowing air from within the reservoir to pass out to the atmosphere from the passageways 19 and 21. The release valve just described is also of conventional construction and forms no part of the present invention. The operating mechanism comprises a rocker arm 26 in engagement with the end of the valve stem 22 and movable in either direction upon fulcrum pins 27 which are fastened to an extension 28 forming a part of the cap 20. Levers 29 and 30, respectively, are attached to and extend from each end of the rocker arm 26, said levers being formed with eyes 31 for attachment with rods 32 and 33, respectively. Actuation of either rod from the side of the railway car will rock the arm 26 to depress the valve stem 22 thereby opening the valve 23 for bleeding the reservoir 5.

Brackets 34 and 35 of the type best shown in Figure 1 of the drawing are suitably secured to opposed sides of the car 6, said brackets having angular outer ends 36 and elongated slots 37. A slot 38 communicates with and is formed at right angles to the slots 37 in the upper end of the brackets. The rods 32 and 33 extend through the slots 37 with the free end of said rods bent downwardly at substantially right angles as indicated at 39 to form hand grips. The area of the rods 32 and 33 adjacent the bent ends 39 is formed with laterally extending notches 40 adapted to engage the end wall of the slot 38 when either rod is pulled forwardly to open the valve 16. In the operation of the invention, the trainman pulls either rod 32 or 33 to rock the arm 26 through the medium of an arm 29 thereby depressing the valve stem 22. As the rod 32 is pulled outwardly the outer end thereof will ride within the slot 37 until one of the notches 40 is in engagement with the end wall of the slot 38. In this position, the rod will be locked thereby maintaining the valve stem compressed to release the valve 23 from its seat 24. Bleeding of the reservoir 5 will then be effected and air will continue to escape therefrom until said reservoir is entirely empty.

A further feature of the present invention provides for automatically disengaging the locking rods from their brackets. An arm 41 extends vertically from the piston rod 11 and is welded or otherwise suitably secured thereto. The upper end of the arm 41 supports a cross bar 42, the ends of which are suitably secured to transverse bars 43. The bars 43 extend toward the valve 16 through guides 44 attached to the wall of the cylinder 7 and the ends of said bars are formed with engaging members 45. With the valve 16 in open position, as shown in Figure 2 of the drawing, air will be exhausted from the reservoir 5 and with the escape thereof the piston rod 11 and its piston, not shown, will move inwardly within the guide 9. Since the arm 41 is attached to the piston rod 11, said arm and its associated bars 43 will move in unison with the piston rod until the engaging members 45 contact the rods 32 and 33. When the members 45 are in position to contact the rods 32 and 33, substantially all of the air within the reservoir 5 will have been exhausted. Contact of the members 45 with the rods 32 and 33 will effect disengagement of the notches 40 from the slot 38 permitting the rods to return to normal position and releasing pressure on the stem 22 whereupon the spring 25 will return the valve 23 to its seat 24. Thus it will be seen that a manual means has been provided for opening the release valve of the reservoir and for locking the same in open position with additional means provided for automatically releasing the locking means. Therefore, the trainman does not have to be concerned with the release valve after it has been opened and locked in open position thereby enabling him to give his attention to other matters.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. The combination with an auxiliary brake reservoir of a railway car having a normally closed drain valve, a cylinder communicating with one end of said reservoir, and a piston carrying rod operating in said cylinder, of a pull rod having one end rockably mounted for operating said drain valve, a guide bracket at the side of the car provided with a slot through which the pull rod extends, said rod adapted to be pulled outwardly through said slot for opening the drain valve, means on said rod for locking the same in said slot, means attached to and operating with said piston rod for releasing said locked rod, said means including a vertically extending arm attached to said piston rod, a cross bar attached to said arm, a transverse bar carried by said cross bar and slidable through guide members on said cylinder, and a member carried by the free end of said transverse bar for contact with the locked rod as the piston rod is drawn within said cylinder upon the reduction of air in said reservoir.

2. The combination with an auxiliary brake reservoir of a railway car having a normally closed drain valve, a cylinder communicating with one end of the reservoir, a piston carrying rod operating in said cylinder, pull rods for opening the drain valve and extending to the sides of a car, means for locking said pull rods in their outward position for holding the valve open, an arm rigidly carried by the piston rod, and parallel rods carried by the arm and having forked ends adapted to engage the pull rods when the piston rod is forced inwardly, whereby said rods are released to allow the closing of the valve.

3. The combination with an auxiliary brake reservoir of a railway car having a normally closed drain valve, a cylinder communicating with one end of the reservoir, a piston carrying rod operating in said cylinder, pull rods for opening the drain valve and extending to the sides of the car, means for locking said pull rods in their outward position for holding the valve open, an arm rigidly carried by the piston rod, laterally extending rods carried by the upper end of the arm, parallel guided rods carried by the outer ends of the laterally extending rods and provided at their free ends with forked members adapted to move the pull rods laterally for releasing the holding means when the piston rod is forced inwardly.

JAMES E. BRYANT.